Figure 1:
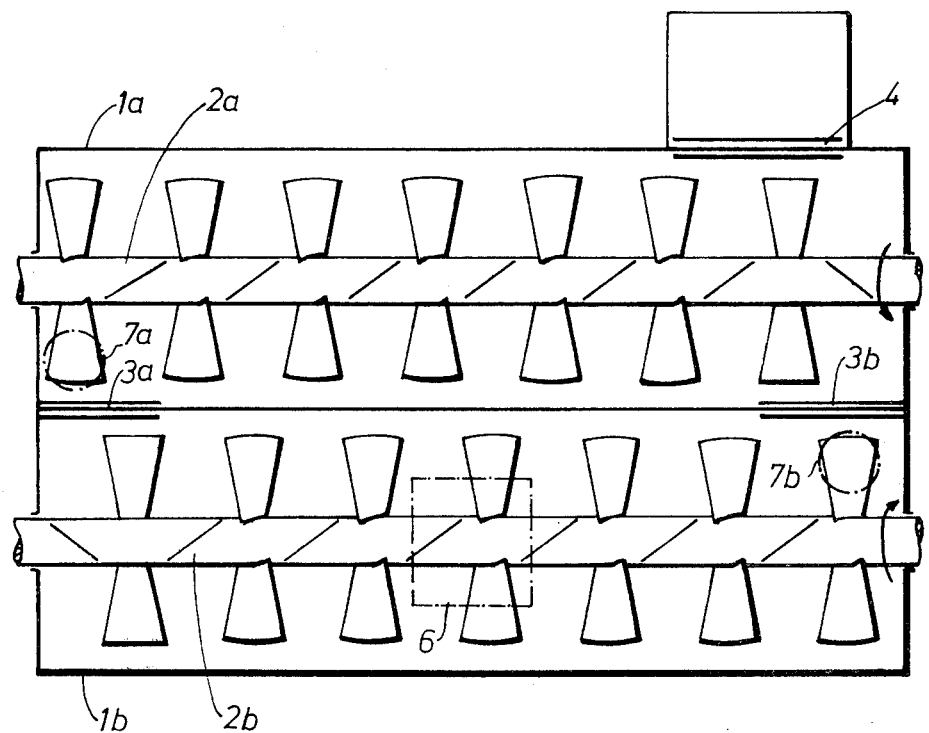

United States Patent
Spreckelmeyer et al.

[11] 4,010,245
[45] Mar. 1, 1977

[54] PRODUCTION OF HYDROGEN FLUORIDE AND CALCIUM SULFATE

[75] Inventors: Bernhard Spreckelmeyer, Leverkusen; Hans Guth, Bergisch-Neukirchen; Werner Schabacher; Hermann Rohe, both of Leverkusen, all of Germany

[73] Assignee: Bayer Aktiengesellschaft, Leverkusen, Germany

[22] Filed: July 15, 1975

[21] Appl. No.: 596,050

[30] Foreign Application Priority Data

July 24, 1974 Germany .......................... 2435512

[52] U.S. Cl. ................................. 423/485; 423/555
[51] Int. Cl.[2] ...................... C01B 7/22; C01F 11/46
[58] Field of Search .......... 423/170, 166, 485, 555; 106/109

[56] References Cited

UNITED STATES PATENTS

| | | | |
|---|---|---|---|
| 3,607,121 | 9/1971 | Watson et al. | 423/485 |
| 3,718,736 | 2/1973 | Watson et al. | 423/485 |
| 3,825,655 | 7/1974 | Eipeltauer et al. | 423/485 |

FOREIGN PATENTS OR APPLICATIONS

| | | | |
|---|---|---|---|
| 1,037,133 | 7/1966 | United Kingdom | 423/485 |

*Primary Examiner*—Oscar R. Vertiz
*Assistant Examiner*—Gary P. Straub
*Attorney, Agent, or Firm*—Burgess, Dinklage & Sprung

[57] ABSTRACT

In the production of hydrofluoric acid and calcium sulfate by subjecting sulfuric acid and fluorspar to a partial preliminary reaction in a preliminary reaction zone and the reaction is completed in an after-reaction zone at a temperature from about 100° to 500° C, the improvement which comprises effecting the preliminary reaction by circulating preliminary reaction product through said preliminary reaction zone, adding to the circulating preliminary reaction product at spaced locations in the preliminary reaction zone sulfuric acid preheated to a temperature of about 80° to 200° C and fluorspar preheated to a temperature of about 400° to 800° C, removing from said preliminary reaction zone gaseous hydrofluoric acid and a substantially dry mixture of calcium sulfate, unreacted sulfuric acid and fluorspar, and passing said dry mixture of calcium sulfate, unreacted sulfuric acid and fluorspar to said after-reaction zone. Only some of the necessary sulfuric acid may be supplied to the preliminary reaction zone and the balance supplied to the after-reaction zone. Heating of the preliminary reaction zone can be external or materials can be added which will react exothermically, e.g. $SO_3$ to react with water in the system, CaO to react with sulfuric acid. A suitable apparatus is provided, comprising two parallel troughs connected at their ends by overflows and with oppositely rotating screws to circulate the contents. Means are provided for introducing reactants at spaced locations and for removing a mixture of product plus unreacted starting materials.

8 Claims, 2 Drawing Figures

PRODUCTION OF HYDROGEN FLUORIDE AND CALCIUM SULFATE

This invention relates to a process and to an apparatus for the production of hydrofluoric acid and calcium sulfate from hot sulfuric acid and hot fluorspar with greatly reduced dust formation by initially reacting the reaction components in a circulated bed and completing the reaction in a furnace.

Hydrogen fluoride is produced commercially be reacting concentrated sulfuric acid with fluorspar in a heated reaction vessel, for example in a rotating tubular furnace. To this end, the fluorspar is, for example, initially mixed in a mixer with a substantially stoichiometric quantity of sulfuric acid either at room temperature or at an elevated temperature. As a result of the reaction which takes place between the fluorspar and the sulfuric acid, the mixture soon thickens to a pasty consistency, so that it tends to stick to and form a cake-like deposit on the walls of the reaction vessel. This not only slows down the reaction, but it also increases corrosion of the constituent material of the reaction vessel. The reaction is then completed by heating the mixture to temperatures in the range from 150° C to 350° C. The formation of paste-like intermediate products is promoted by an increasing content of flotation agents in the fluorspar.

Various methods have already been proposed for overcoming these difficulties.

According to British Patent Specification No. 845,273, caking in the reaction furnace may be prevented by intimately mixing stoichiometric quantities of fluorspar and sulfuric acid in a sensitive kneading system to form a granular product which is then converted into a dry powder in the furnace.

British Patent Specification No. 1,304,781 describes a process for the production of hydrofluoric acid from fluorspar and sulfuric acid at temperatures of from about 121° C to 316° C, in which calcium sulfate already formed in large quantities is recycled and mixed inside the furnace during the reaction in order to avoid crust formation on the walls of the furnace.

It is also known that the so-called paste phase can be transferred to a mixer preceding the heating apparatus, rather than to the heating apparatus itself, in order to reduce corrosion in the furnace. According to German Patent Specification No. 1,040,001 for example, one or both starting materials are introduced into and mixed with heating in an apparatus preceding the actual reaction zone, and the solid, dry granulate formed is subsequently transferred to the adjoining reaction vessel and decomposed into gaseous hydrogen fluoride and calcium sulfate.

It is also known that the calcium fluoride can be heated to elevated temperatures. In the process described in British Patent Specification No. 940,289, fluorspar calcined in a fluidized bed at about 425° C to 705° C is introduced while still hot into the reaction zone, heated to 150°–315° C, of a rotating tubular furnace. In the process according to British Patent Specification No. 1,371,790, the disclosure of which is incorporated herein by reference, a metal fluoride is continuously preheated under special conditions in a gas-solid suspension with a gas stream heated to between 500° C and 1200° C.

British Patent Specification No. 1,173,529 describes a process in which particulate calcium fluoride which has been preheated to between 300° C and 420° C is reacted with hot sulfuric acid at 150° C to 300° C in a free-fall reaction zone in order to reduce both the amount of heat required for the reaction and the reaction time.

Although the reaction of hot fluorspar free from flotation agents with hot sulfuric acid provides for the abundant supply of energy in the initial phase of the reaction, thereby largely obviating the disadvantages involved in using cold reactants, a considerable quantity of a very finely particulate calcium fluoride and calcium sulfate dust are formed during the very vigorous reaction between the hot reaction components. This fine dust is readily entrained by the reaction gases escaping from the reaction vessel and gives rise to difficulties during subsequent working up of the hydrofluoric acid.

Accordingly, the object of the present invention is to provide a process and an apparatus therefor by which the formation of dust during the reaction of hot sulfuric acid with hot fluorspar is greatly reduced while, at the same time, lumping or caking of the reaction mixture in the reaction zone is prevented, thus providing for a rapid preliminary reaction.

According to the invention, this object is achieved by virtue of the fact that the hot reactants are added at separate points to the preliminary reaction product which, at the same time, is circulated, optionally under heat.

Accordingly, the present invention provides a process for the production of hydrofluoric acid and calcium sulfate from hot sulfuric acid and hot fluorspar by subjecting the reaction components to a preliminary reaction and subsequently completing the reaction at temperatures in the range from 100° C to 500° C, characterized by the fact that fluorspar which has been preheated to a temperature of from 400° C to 800° C and sulfuric acid at a temperature of 80° to 200° C are added at separate points to the preliminary reaction product which, at the same time, is circulated, optionally under heat, after which the substantially dry preliminary reaction product is thermally decomposed into calcium sulfate and hydrogen fluoride in a post-reaction zone.

It has surprisingly been found that most of the disadvantages referred to above can be obviated in this way. By circulating the loose preliminary reaction product and by introducing the products into the circulated reaction product at separate points, the formation of dust is almost completely suppressed and the reactants are effectively intermixed, thereby enabling their volume-time yield through the furnace to be greatly increased as well. It is thus possible to make full use of the advantages of directly reacting preheated starting material without having to accept any accompanying disadvantages. Further advantages include reduced corrosion in the actual reaction vessel and the absence of lumping and caking. Accordingly, the process according to the invention not only has an increased volume-time yield despite reduced energy consumption (furnace throughput is increased by about 20%), it also gives an improved yield of HF, based on the starting material. By virtue of the considerable reduction in corrosion, the quantity of $SO_2$ present in the HF is also minimal.

The preliminary reaction product should be kept at a temperature of about 100° C to 200° C, preferably about 140° to 160° C, in the preliminary reaction zone, which may involve additional heating.

In general, as much as about 50 to 100% of the quantity of sulfuric acid required for the reaction as a whole are added during the preliminary reaction. The remaining quantity up to about 50% is added during the post-reaction. It is of particular advantage to introduce as much as about 80 to 100% of the total quantity of sulfuric acid required into the preliminary reaction zone.

Concentrated sulfuric acid, (for example about 75% to 95%) is generally used. One preferred embodiment uses concentrated sulfuric acid containing hydrofluoric acid of the type which may be obtained in accordance with German Offenlegungsschrift No. 2,209,960. It is known from this German Offenlegungsschrift that the sulfuric acid can be heated by the hot hydrogen fluoride gases formed where this sulfuric acid is simultaneously used for washing out the crude gases. After the sulfuric acid containing water and hydrofluoric acid has been concentrated with oleum, the sulfuric acid thus obtained is introduced as reactant into the reaction furnace. A sulfuric acid of this kind, also referred to hereinafter as feed acid, contains approximately 90% of $H_2SO_4$ together with water and hydrofluoric acid.

In another preferred embodiment, the sulfuric acid is replaced completely or partially by sulfur trioxide, depending upon the quantity of water formed or additionally added. In this way, a considerable quantity of heat is introduced into the reaction medium through the reaction of sulfur trioxide with the water.

The process according to the invention may be carried out with any fluoride-containing starting materials. It is normally carried out with naturally occurring metal fluorides, preferably fluorspar (calcium fluoride) which is worked up in conventional manner, for example by flotation, or is synthetically produced, for example by reacting $CaCO_3$ with $H_2SiF_6$. However, the process according to the invention may be applied equally effectively to other fluorides, for example precipitated calcium fluoride or alkali metal and alkaline-earth metal fluorides.

Energy is supplied to the reaction by preheating the starting components in any way. The sulfuric acid may be heated to temperatures of about 80° C to 200° C, preferably about 120° C to 150° C, and the fluoride to temperatures of about 400° C to around 800° C, preferably about 450° C to 550° C.

Depending upon the impurities present in them, the metal fluorides are heated until all the substances emanating from the flotation agent, for example saturated and unsaturated fatty acids, have been removed. The sulfide sulfur content of the starting materials, for example the fluorspar, is also reduced in this way. In order to destroy these organic and inorganic substances, temperatures above about 400° C generally have to be applied. However, if preheating is carried out at temperatures above about 800° C, undesirable caking is likely to occur.

In one simple embodiment of the process according to the invention, the starting substances are introduced at separate points into a preliminary reaction vessel already containing preliminary reaction product and circulated by means of a suitable mixing system, for example mixing arms, discharged from the preliminary reactor and delivered for further reaction to the actual reaction furnace, for example a rotating tubular furnace. The reaction is then completed at temperatures in the range from about 100° to 500° C, after which the reaction products formed are worked up in conventional manner.

Instead of using a single preliminary reactor, it is also possible to use a cascade of preliminary reactors, in which case different conditions, for example different temperatures, residence times or concentrations, may be maintained between the individual reaction zones.

The reaction conditions prevailing in the preliminary reactor are selected so that most of the hydrogen fluoride which escapes from the preliminary reaction mixture is formed in the first stage. The HF-containing vapor escaping from the preliminary reactor contains quantities of water corresponding to the sulfuric acid concentration used, together with small quantities of sulfuric acid, but is largely free from dust. The reaction gases are preferably introduced into the adjoining reaction zone from which they are removed with the other HF-containing gases. This can be carried out either under the so-called parallel-current principle at the end of the rotating tubular furnace, i.e. where the calcium sulfate also leaves the furnace, or under the counter-current principle at the beginning of the furnace where the reaction mixture is introduced. However, the reaction gases may also be removed, preferably after combination with the other reaction gases, in a separator following the preliminary reaction zone. The gases are obtained free from water by subsequently scrubbing them with sulfuric acid in the usual way and further processing them into pure HF by fractional condensation and/or distillation.

The hot solids mixture formed by the preliminary reaction may readily be discharged straight into the after-reactor through an optionally adjustable overflow. The product is preferably discharged in to a suitable conveyor, for example a screw conveyor, and delivered to the after-reactor. So-called ribbon screws are particularly suitable for this purpose. In addition to transporting solid products, screws of this kind also enable the reaction gases to be removed.

The solid product discharged from the preliminary reactor is not tacky, has a dry to earthy consistency and is uniformly intermixed, so that the reaction mixture does not adhere to, smear of form lumps in the reaction zone. As much as about 50 to 80% of the reaction takes place in the preliminary reactor, the degree of reaction being largely determined by the temperatures and residence time in the preliminary reactor. The average residence time in the preliminary reactor, which is calculated from the ratio of the quantity present in it to throughput, is about 3 to 20 minutes. Residence times longer than 20 minutes are also possible, although they are not recommended for economic reasons on account of the large vessel volume required.

The necessary preliminary reaction temperature of about 100° C to 200° C can be regulated in different ways, for example by dosing the sulfuric acid, by applying heat from outside, for example by indirectly heating the preliminary reactor, for example with steam, by using the correspondingly preheated reaction components or, as described hereinafter, by adding substances which react exothermically with the reaction mixtures or with the reaction components.

In this special embodiment of the process according to the invention, substances which react exothermically with sulfuric acid to form substances that are inert with respect to the reaction products may be added, for example, together with the fluorides or at any other point of the process in known manner. In this context, inert means that the properties of the metal sulfate formed are not adversely affected, nor is the hydrofluoric acid contaminated.

The addition of substances which generate heat during their reaction with the reaction mixture affords considerable advantages. Under standard conditions, the reaction

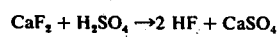

with a heat output of 15.3 kcal is endothermic. In addition, a minimum temperature of about 100° C has to be maintained in order to remove the hydrofluoric acid from the preliminary reaction mixture. In practice, the quantity of heat required for the process is supplied to the reaction mixture by indirect heating. The transfer of heat to the reaction mixture is relatively poor. However, since the throughput of reaction mixture is governed by the time in which the necessary energy can be supplied to a mixture, relatively high external temperatures must be used.

The quantity of heat to be supplied to the systems from outside can be reduced corresponding to the quantity of substances added and the amount of heat released. The result of this is that either the temperatures to which the system has to be heated may be reduced, or heating may be carried out over a shorter period for the same temperature.

Although it is preferred to add calcium oxide, it is also possible to add other substances which react exothermically with $H_2SO_4$, for example $Ca(OH)_2$, $Na(OH)$, etc. $SO_3$ has to be added in an amount corresponding to the quantity of water formed.

The quantity of additives in proportion to the metal fluoride may vary within relatively wide limits. Additions of up to about 20 mole % are possible. In the case of CaO, it is advantageous to use, for example, quantities of about 2 to 15 mole %, based on the $CaF_2$-content of the fluorspar.

In one particularly preferred embodiment of the process according to the invention, the preliminary reaction is carried out in two parallel beds. These beds are circulated by paddle screws rotating in opposite directions to one another. The two ends of the beds are connected through overflows in the partition arranged between the two beds. The level of the overflows is preferably adjusted by a barrier. In this way it is possible to circulate the preliminary reaction product. At the end of one of the beds there is an optionally adjustable overflow for discharging the preliminary reaction product. In general, the reaction gases formed also leave the preliminary reactor through this overflow.

Figure 2:
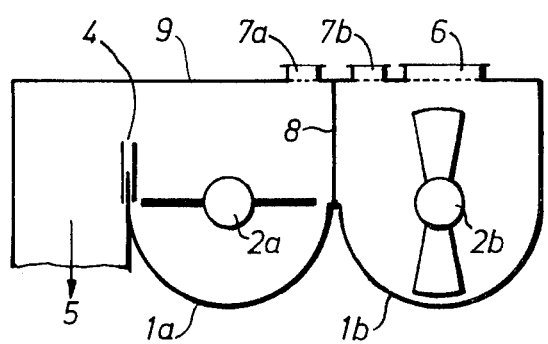

The apparatus for carrying out this embodiment of the process according to the invention is described in more detail in the accompanying drawings wherein:

FIG. 1 is a schematic plan view of the apparatus; and
FIG. 2 is a schematic end view of the apparatus with the end plate removed.

The reference numerals used in FIGS. 1 and 2 have the following meaning:

| | |
|---|---|
| 1a, 1b | troughs |
| 2a, 2b | paddle screws |
| 3a, 3b | overflows |
| 4 | overflow for discharging the preliminary reaction product |
| 5 | ribbon screw |

-continued

| | |
|---|---|
| 6 | fluorspar inlet |
| 7a, 7b | sulfuric acid inlets |
| 8 | partition |
| 9 | cover plate |

The apparatus consists essentially of two parallel, indirectly heatable troughs 1a, 1b separated from one another by a partition 8 and covered by a plate 9. Two paddle screws 2a, 2b rotating in opposite directions are arranged in the troughs 1a, 1b. The two troughs are inter-connected at their ends through overflows 3a, 3b the level of which is advantageously adjusted by barriers. At the end of one trough 1a, there is another, preferably adjustable overflow 4 for discharging the preliminary reaction product to a conveyor 5 (not shown), for example a ribbon screw, which carries the hot preliminary reaction product into a reaction furnace, normally a rotating tubular furnace. Inlets for fluorspar 6 and sulfuric acid 7a and 7b, preferably alternating with one another, are provided at several, separate points in the cover plate 9.

The correspondingly preheated reactants, namely sulfuric acid and fluorspar, are not directly combined, but instead are added at 6 and 7a and 7b to the already pre-reacted reaction mixture which is circulated by means of the paddle screws 2a, 2b through both troughs 1a, 1b. The troughs are externally heated with steam. The hot reaction gases and the preliminary reaction product at a temperature of 100° to 200° C, leave the preliminary reactor at 4 and are delivered to the actual reaction furnace, preferably together by means of a ribbon screw. The average residence time of the reactants in the preliminary reactor of which from 50% to 80% should be reacted by the time they leave the preliminary reactor, is regulated by adjusting the overflows 3a, 3b and 4. The additives which react exothermically with the preliminary reaction product may be added to it through the inlets: acid additives through 6 and basic additives through 7a and 7b.

The process according to the invention is illustrated by the following Examples:

EXAMPLE 1

40 parts by weight per minute of fluorspar (97% $CaF_2$) with a temperature of about 450° C and 56 parts by weight per minute of feed acid (approximately 90% sulfuric acid containing $H_2O$ and HF) with a temperature of 120° C, were introduced at separate points into a preliminary reactor of the kind shown in FIGS. 1 and 2. The temperature of the preliminary reaction product was kept at around 130° C by additional heating. Its average residence time in the preliminary reactor was 6 minutes. The friable product which issued from the preliminary reactor still contained approximately 21% of $CaF_2$ and approximately 21% of $H_2SO_4$, corresponding to a degree of reaction of about 49 and 50%, respectively. Hardly any dust was formed during the reaction.

EXAMPLE 2

Following the procedure of Example 1, 60 parts by weight per minute of fluorspar at a temperature of 450° C and 83 parts by weight per minute of feed acid at a temperature of 150° C were introduced into a preliminary reactor. The preliminary reactor was additionally heated. The temperature of the preliminary reaction product issuing from the preliminary reactor was about 130° C. Its average residence time in the preliminary reactor was about 4 minutes. The degree of reaction amounted to approximately 60%. The preliminary reaction product was then transferred while still hot to a reaction furnace and the reaction completed by heating to around 200° C. The average residence time in the reaction furnace was about 4 hours. The $CaF_2$- and $H_2SO_4$-contents of the cinders ($CaSO_4$) amounted to 0.5 and 1.0% respectively. This corresponded to a total reaction of 99% and 98.2%, respectively. Hardly any dust was formed during the preliminary and main reactions.

It will be appreciated that the instant specification and examples are set forth by way of illustration and not limitation, and that various modifications and changes may be made without departing from the spirit and scope of the present invention.

What is claimed is:

1. In the production of hydrofluoric acid and calcium sulfate by subjecting sulfuric acid and fluorspar to a partial preliminary reaction in a preliminary reaction zone and the reaction is completed in an after-reaction zone at a temperature from about 100° to 500° C, the improvement which comprises effecting the preliminary reaction by circulating preliminary reaction product comprising partially reacted fluorspar mixed with calcium sulfate through said preliminary reaction zone comprising first and second adjacent beds connected together at their ends, continuously adding to the circulating preliminary reaction product at spaced locations in the preliminary reaction zone sulfuric acid preheated to a temperature of about 80° to 200° C and fluorspar preheated to a temperature of about 400° to 800° C, removing from said preliminary reaction zone gaseous hydrofluoric acid, continuously removing from the first bed a portion of the material comprising a substantially dry mixture of calcium sulfate, unreacted sulfuric acid and fluorspar, passing said dry mixture of calcium sulfate, unreacted sulfuric acid and fluorspar to said after-reaction zone, the balance of the material from the first bed being returned to the second bed, therein being first mixed with sulfuric acid and at a downstream location spaced therefrom being mixed with fluorspar, the resultant mixture being passed to the first bed, and therein being mixed with additional sulfuric acid prior to removal of another portion of the material, at least about 50% but less than 100% of the quantity of sulfuric acid required for the complete reaction being introduced into the preliminary reaction zone and the remaining sulfuric acid being introduced into the after reaction zone.

2. A process as claimed in claim 1, wherein the preliminary reaction product passed to said after-treatment zone has a temperature of about 100° to 200° C.

3. A process as claimed in claim 1, wherein the average residence time of the sulfuric acid and fluorspar in the preliminary reaction zone is about 3 to 20 minutes.

4. A process as claimed in claim 1, wherein heat is indirectly supplied to the preliminary reaction zone.

5. A process as claimed in claim 1, wherein there is added to the preliminary reaction zone a substance which exothermically reacts to generate heat.

6. A process as claimed in claim 5, wherein said substance is calcium oxide.

7. A process as claimed in claim 1, wherein part of the heat required for the reaction is supplied by adding the sulfuric acid as a concentrated aqueous solution along with sulfur trioxide which exothermically reacts with the water in the concentrated sulfuric acid.

8. A process as claimed in claim 1, wherein about 50 to 80% of the quantity of sulfuric acid required for the complete reaction are introduced into the preliminary reaction zone and the remaining sulfuric acid is introduced into the after-reaction zone, the average residence time of the sulfuric acid and fluorspar in the preliminary reaction zone is about 3 to 20 minutes, a part of the heat required for reaction between the sulfuric acid and fluorspar is indirectly supplied to the preliminary reaction zone and a part is supplied by adding a substance which exothermically reacts to generate heat, and the preliminary reaction product passed to said after-treatment zone has a temperature of about 100° to 200° C.

* * * * *